United States Patent
Xiao et al.

(10) Patent No.: US 11,951,465 B2
(45) Date of Patent: Apr. 9, 2024

(54) SOLUTION-BASED APPROACH TO MAKE POROUS COATINGS FOR SINTER-RESISTANT CATALYSTS

(71) Applicant: GM GLOBAL TECHNOLOGY OPERATIONS LLC, Detroit, MI (US)

(72) Inventors: Xingcheng Xiao, Troy, MI (US); Gongshin Qi, Troy, MI (US); Ryan J. Day, Waterford, MI (US); Ming Yang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1072 days.

(21) Appl. No.: 16/454,709

(22) Filed: Jun. 27, 2019

(65) Prior Publication Data
US 2019/0314804 A1 Oct. 17, 2019

Related U.S. Application Data

(62) Division of application No. 15/399,179, filed on Jan. 5, 2017, now Pat. No. 10,376,872.

(51) Int. Cl.
*B01J 37/03* (2006.01)
*B01J 23/42* (2006.01)
(Continued)

(52) U.S. Cl.
CPC ............ *B01J 37/035* (2013.01); *B01J 23/42* (2013.01); *B01J 23/44* (2013.01); *B01J 35/0013* (2013.01);
(Continued)

(58) Field of Classification Search
CPC . B01J 37/035; B01J 23/42; B01J 23/44; B01J 35/0013; B01J 35/0086; B01J 37/08; B01J 37/18
See application file for complete search history.

(56) References Cited

U.S. PATENT DOCUMENTS 3,656,915 A ‡ 4/1972 Tourtellotte ............. B01J 8/048
422/171
5,358,920 A 10/1994 Ma et al.
(Continued)

FOREIGN PATENT DOCUMENTS

CA 1323360 C 10/1993
CN 87101513 A 10/1988
(Continued)

OTHER PUBLICATIONS

First Office Action for Chinese Patent Application No. 201710043844.8 dated Jan. 21, 2019 with English language machine translation, 16 pages.‡
(Continued)

*Primary Examiner* — James A Fiorito
(74) *Attorney, Agent, or Firm* — Harness, Dickey & Pierce, P.L.C.

(57) ABSTRACT

Catalyst systems that are resistant to high-temperature sintering and methods for preparing such catalyst systems that are resistant to sintering at high temperatures are provided. Methods of forming such catalyst systems include contacting a support having a surface including a catalyst particle with a solution comprising a metal salt and having an acidic pH. The metal salt is precipitated onto the surface of the support. Next, the metal salt is calcined to selectively generate a porous coating of metal oxide on the surface of the support distributed around the catalyst particle.

14 Claims, 4 Drawing Sheets

(51) Int. Cl.
  *B01J 23/44* (2006.01)
  *B01J 35/00* (2006.01)
  *B01J 37/08* (2006.01)
  *B01J 37/18* (2006.01)

(52) U.S. Cl.
  CPC .......... *B01J 35/0086* (2013.01); *B01J 37/08* (2013.01); *B01J 37/18* (2013.01)

(56) References Cited

U.S. PATENT DOCUMENTS

| | | | |
|---|---|---|---|
| 5,597,772 | A | 1/1997 | McCabe et al. |
| 7,163,963 | B2 | 1/2007 | Fraenkel |
| 7,888,278 | B2 | 2/2011 | Rapier et al. |
| 8,389,435 | B2 | 3/2013 | Miura et al. |
| 8,530,528 | B2 | 9/2013 | Allison et al. |
| 8,865,609 | B2 | 10/2014 | Zhou et al. |
| 9,314,771 | B2 ‡ | 4/2016 | D'Souza ................. B01J 21/16 |
| 9,649,627 | B1 ‡ | 5/2017 | Xiao ........................ B01J 23/40 |
| 9,731,273 | B2 ‡ | 8/2017 | D'Souza ................. B01J 21/16 |
| 9,901,907 | B1 ‡ | 2/2018 | Xiao ..................... B01D 53/944 |
| 10,562,017 | B2 | 2/2020 | Yang et al. |
| 10,596,563 | B2 | 3/2020 | Qi et al. |
| 2004/0232049 | A1 ‡ | 11/2004 | Dath ........................ B01J 21/16 |
| | | | 208/14 |
| 2005/0170957 | A1 ‡ | 8/2005 | Maus ........................ B01J 35/04 |
| | | | 502/439 |
| 2006/0070915 | A1 | 4/2006 | Euzen et al. |
| 2006/0120936 | A1 ‡ | 6/2006 | Alive ..................... B01D 53/944 |
| | | | 423/215.5 |
| 2010/0248957 | A1 ‡ | 9/2010 | Takeshima ........... B01D 53/945 |
| | | | 502/43 |
| 2011/0311422 | A1 ‡ | 12/2011 | Bentele ................ B01D 53/944 |
| | | | 423/213.5 |
| 2013/0034472 | A1 * | 2/2013 | Cantrell ................... B01J 23/10 |
| | | | 977/773 |
| 2013/0267411 | A1 ‡ | 10/2013 | Woodfield ............... B01J 23/83 |
| | | | 502/30 |
| 2013/0336864 | A1 | 12/2013 | Zheng et al. |
| 2017/0095795 | A1 ‡ | 4/2017 | Xiao ..................... B01D 53/944 |
| 2017/0095796 | A1 ‡ | 4/2017 | Qi ............................ B01J 23/63 |
| 2017/0095806 | A1 ‡ | 4/2017 | Qi ........................... B01J 37/349 |
| 2017/0095807 | A1 ‡ | 4/2017 | Xiao ..................... F01N 3/2825 |
| 2017/0114458 | A1 ‡ | 4/2017 | Xiao ..................... F01N 3/101 |
| 2018/0111111 | A1 ‡ | 4/2018 | Yang ..................... B01J 35/0006 |
| 2018/0111112 | A1 ‡ | 4/2018 | Yang ..................... B01D 53/945 |
| 2018/0185831 | A1 ‡ | 7/2018 | Yang ..................... B01J 37/0221 |
| 2018/0185832 | A1 | 7/2018 | Xiao et al. |
| 2018/0214859 | A1 ‡ | 8/2018 | Qi ............................ B01J 21/04 |
| 2018/0214860 | A1 ‡ | 8/2018 | Qi ............................ B01J 21/04 |

FOREIGN PATENT DOCUMENTS

| | | | |
|---|---|---|---|
| CN | 1088482 | A | 6/1994 |
| CN | 101056692 | A | 10/2007 |
| CN | 101415495 | A | 4/2009 |
| CN | 102671716 | A | 9/2012 |
| CN | 102883807 | A | 1/2013 |
| CN | 102909005 | A ‡ | 2/2013 |
| CN | 102909005 | A | 2/2013 |
| CN | 102909020 | A | 2/2013 |
| CN | 103191750 | A ‡ | 7/2013 |
| CN | 103191750 | A | 7/2013 |
| CN | 104039446 | A | 9/2014 |
| CN | 104540782 | A | 4/2015 |
| CN | 104645983 | A | 5/2015 |
| CN | 105032446 | A | 11/2015 |
| CN | 105148908 | A | 12/2015 |
| CN | 105246590 | A | 1/2016 |
| CN | 105246590 | A ‡ | 1/2016 |
| CN | 105435773 | A | 3/2016 |
| CN | 105441999 | A | 3/2016 |
| CN | 105478114 | A | 4/2016 |
| CN | 107020153 | A | 8/2017 |
| CN | 107020153 | A ‡ | 8/2017 |
| CN | 108273497 | A ‡ | 7/2018 |
| CN | 108273497 | A | 7/2018 |
| CN | 108273568 | A | 7/2018 |
| CN | 108273568 | A ‡ | 7/2018 |
| CN | 108355649 | A | 8/2018 |
| CN | 108355649 | A ‡ | 8/2018 |
| CN | 108371950 | A | 8/2018 |
| CN | 108371950 | A ‡ | 8/2018 |
| DE | 102017101237 | A1 ‡ | 8/2017 |
| DE | 102017101237 | A1 | 8/2017 |
| DE | 102018100081 | A1 | 7/2018 |
| DE | 102018100081 | A1 ‡ | 7/2018 |
| DE | 102018100092 | A1 | 7/2018 |
| DE | 102018100092 | A1 ‡ | 7/2018 |
| DE | 1 02018101702 | A1 ‡ | 8/2018 |
| DE | 10201810161 0 | A1 ‡ | 8/2018 |
| DE | 102018101610 | A1 | 8/2018 |
| DE | 102018101702 | A1 | 8/2018 |

OTHER PUBLICATIONS

Sun, Zhenyu et al., "Thermal-Stable Carbon Nanotube-Supported Metal Nanocatalysts by Mesoporous Silica Coating," Langmuir 2011, 27, 10, pp. 6244-6251; DOI: 10.10211a1050871 (Published online: Apr. 11, 2011) (Abstract Only).‡

M. Astier et al.; "Sintering and Catalysis"; vol. 10 of the seriew Materials Science Research; G.C. Kuczynski (ed.), Sintering and Catalysis, Plenum Press, New York, 1975; pp. 63 and 64.‡

Xiao, Xingcheng et al.; U.S. Appl. No. 15/010,937, filed Jan. 29, 2016 entitled "Sinter-Resistant Low-Cost Catalysts Manufactured by Solution-Based Nanoparticle Coating Processes"; 30 pages.‡

Yang, Ming et al.; U.S. Appl. No. 15/399,151, filed Jan. 5, 2017 entitled "Ion Adsorption of Oxide Layers To Hinder Catalyst Sinterin"; 44 pages.‡

Qi, Gongshin et al.; U.S. Appl. No. 15/419,263, filed Jan. 30, 2017 entitled "Highly Stable Platinum Group Metal PGM Catalyst Systems"; 37 pages.‡

Qi, Gongshin et al.; U.S. Appl. No. 15/418,214, filed Jan. 27, 2017 entitled "Sinter-Resistant Stable Catalyst Systems by Trapping of Mobile Platinum Group Metal (PGM) Catalyst Species"; 59 pages.‡

Li et al., A sintering-resistant Pd/SiO2 catalyst by reverse-loading nano iron oxide for aerobic oxidation of benzyl alcohol, 2015, RSC Advances (Year: 2015).‡

Lin et al., The mechanism of reduction of cobalt by hydrogen, 2004, Materials Chemistry and Physics, 85, 171-175 (Year: 2004).‡

U.S. Appl. No. 15/399,151, filed Jan. 5, 2017, Ming Yang et al.
U.S. Appl. No. 15/418,214, filed Jan. 27, 2017, Gongshin Qi et al.
U.S. Appl. No. 15/419,263, filed Jan. 30, 2017, Gongshin Qi et al.
First Office Action for Chinese Patent Application No. 201711421454.6 dated Apr. 9, 2020 with English language machine translation, 18 pages.

First Office Action for Chinese Patent Application No. 201711462966.7 dated Apr. 13, 2020 with English language machine translation, 11 pages.

First Office Action for Chinese Patent Application No. 201810060908.X dated Jul. 10, 2020 with English language machine translation, 11 pages.

First Office Action for Chinese Patent Application No. 201810062938.4 dated Jul. 3, 2020 with English language machine translation, 15 pages.

Wang, Wulin, After-treatment technology of vehicle diesel engine, Beijing, China Science adn Technology Press, 2010, p. 101; ISBN: 978-7-5046-5772-5.

Yongxiang, Zhao et al., "Preparation Chemistry of Supported Noble Metal Catalyst the Effect of Isoelectric Point of Support (IEPS) on the Structure and Catalytic Proprety of Pd/Al2O3 Catalysts," Joumla of Molecular Catalysis (China) vol. 8, No. 1 (Feb. 1994), pp. 30-35 (Abstract only Translation).

Zhang, Jiguang, Catalyst preparation process technology, China Petrochemical Press, Jan. 2006. pp. 280-284; ISBN: 7-80164-568-5.
U.S. Appl. No. 15/399,179, filed Jan. 5, 2017.

(56) References Cited

OTHER PUBLICATIONS

Li et al., A sintering-resistant Pd/SiO2 catalyst by reverse-loading nano iron oxide for aerobic oxidation of benzyl alcohol, RSC Advances 5, 2015, pp. 4766-4769 (Published Dec. 10, 2014); DOI: 10.1039/c4ra14498h.
Liang et al., "Stabilization of Supported Metal Nanoparticles Using an Ultrathin Porous Shell" ACS Catal., 2011, 1 (10), pp. 1162-1165, Aug. 15, 2011.
Lin, Hsin-Yu et al., "The mechanism of reduction of cobalt by hydrogen," Materials Chemistry and Physics, 85 (2004), pp. 171-175.
Sun, Zhenyu et al., "Thermal-Stable Carbon Nanotube-Supported Metal Nanocatalysts by Mesoporous Silica Coating," Langmuir 2011, 27, 10, pp. 6244-6251; DOI: 10.1021la1050871 (Published online: Apr. 11, 2011) (Abstract Only).
Second Office Action for Chinese Patent Application No. 201810062938.4 dated Mar. 8, 2021, with English language machine translation, 14 pages.

\* cited by examiner
‡ imported from a related application

SOLUTION-BASED APPROACH TO MAKE POROUS COATINGS FOR SINTER-RESISTANT CATALYSTS

CROSS-REFERENCE TO RELATED APPLICATIONS

This application is a divisional of U.S. patent application Ser. No. 15/399,179 filed on Jan. 5, 2017. The entire disclosure of the above application is incorporated herein by reference.

INTRODUCTION

This section provides background information related to the present disclosure which is not necessarily prior art.

The present disclosure relates to catalysts that are resistant to sintering at high temperatures and improved methods for preparing catalysts that are resistant to sintering at high temperatures.

Metal nanoparticles can make up the active sites of catalysts used in a variety of applications, such as for the production of fuels, chemicals and pharmaceuticals, and for emissions control from automobiles, factories, and power plants. Because metal nanoparticles tend to agglomerate, this decreases their surface area and active site accessibility, so they are often coupled to support materials. The supports physically separate the metal nanoparticles to prevent agglomeration, and to increase their surface area and active site accessibility. Thus, catalyst systems typically include one or more catalyst compounds; a porous catalyst support material; and one or more optional activators.

After continued use, especially at elevated temperatures, catalyst systems including supported metal particles lose catalytic activity due to sintering, e.g., thermal deactivation that occurs at high temperatures. Through various mechanisms, sintering results in changes in metal particle size distribution over a support and an increase in mean particle size; hence, a decrease in surface area for the active catalyst compounds. For example, particle migration and coalescence is a form of sintering where particles of metal nanoparticles move or diffuse across a support surface, or through a vapor phase, coalesce with another nanoparticle, leading to nanoparticle growth. Ostwald ripening is another form of sintering where migration of mobile species are driven by differences in free energy and local atom concentrations on a support surface. After sintering processes occur, catalyst activity can decrease. Therefore, catalyst systems are often loaded with a sufficient amount of supported catalyst metal particles to account for a loss of catalytic activity over time and to continue to have the ability to meet, for example, emissions standards over a long period of operation at high temperatures.

Various techniques have been employed to decrease sintering of metal nanoparticle catalysts. For example, metals have been alloyed with other metals, metal nanoparticles have been encapsulated with amorphous coatings by, for example, atomic layer deposition, and strong metal nanoparticle anchoring on supports have been attempted. However, these chemistry-based techniques have resulted in only limited success. Accordingly, there remains a need for improved catalysts that are sinter-resistant.

SUMMARY

This section provides a general summary of the disclosure, and is not a comprehensive disclosure of its full scope or all of its features.

In various aspects, the present disclosure provides a method of preparing a catalyst system that is resistant to sintering. The method may include contacting a support having a surface including a catalyst particle with a solution including a metal salt and having an acidic pH. The metal salt may be precipitated onto the surface of the support. The metal salt may be calcined to selectively generate a porous coating of metal oxide on the surface of the support distributed around the catalyst particle.

In one variation, the solution including the metal salt is aqueous and the pH is less than or equal to about 6.

In one variation, the catalyst particle includes a metal selected from the group consisting of: platinum (Pt), ruthenium (Ru), rhodium (Rh), palladium (Pd), osmium (Os), iridium (Ir), gold (Au), iron (Fe), nickel (Ni), manganese (Mn), and combinations thereof.

In one variation, the catalyst particle includes an element selected from the group consisting of: sodium (Na), potassium (K), magnesium (Mg), calcium (Ca), barium (Ba), cerium (Ce), lanthanum (La), phosphorus (P), and combinations thereof.

In one variation, the support includes a metal oxide selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

In one variation, the metal salt includes an element selected from the group consisting of: aluminum (Al), cerium (Ce), zirconium (Zr), titanium (Ti), silicon (Si), magnesium (Mg), zinc (Zn), sodium (Na), potassium (K), barium (Ba), calcium (Ca), and combinations thereof.

In one variation, the metal salt is selected from the group consisting of: aluminum chloride ($AlCl_3$), aluminum nitrate ($Al(NO_3)_3$), aluminum hydroxide ($Al(OH)_3$), aluminum sulfate ($Al_2(SO_4)_3$), aluminum chlorate ($Al(ClO_3)_3$), aluminum phosphate ($AlPO_4$), aluminum metaphosphate ($Al(PO_3)_3$), and combinations thereof.

In one variation, prior to contacting, the method further includes washing the surface of the support including the catalyst particle with an acidic solution.

In one variation, prior to the contacting, the method further includes disposing the support having the surface including the catalyst particle in a reducing atmosphere to promote conversion of the catalyst particle to a metallic state.

In one variation, the disposing the support including the catalyst particle in the reducing atmosphere further includes disposing the support including the catalyst particle in a furnace. The furnace is then purged with a gas mixture comprising an inert gas and hydrogen ($H_2$) at less than or equal to about 3% by volume for greater than or equal to about 30 minutes. The support including the catalyst particle is heated in the furnace having a temperature of greater than or equal to about 200° C. to less than or equal to about 500° C. The method also includes maintaining the support including the catalyst particle at the temperature for greater than or equal to about 30 minutes and cooling the support including the catalyst particle to ambient conditions.

In one variation, heating the support including a catalyst particle occurs at a rate of less than or equal to about 20° C. per minute.

In one variation, the purging includes purging the furnace with the gas mixture having a flow rate of greater than or equal to about 1 standard cubic feet per hour (SCFH).

In one variation, the contacting of the surface of support including the catalyst particle with the solution includes submerging the surface in the solution. The method further includes applying ultrasound to the solution to facilitate the precipitating.

In one variation, the contacting of the surface of support including the catalyst particle with the solution includes submerging the surface in the solution. The method further includes applying mixing the solution with a planetary centrifugal mixer to facilitate the precipitating.

In one variation, the precipitating the metal salt onto the surface of the support includes drying the solution including the metal salt to facilitate the precipitation.

In one variation, the drying occurs at a temperature of greater than or equal to about 50° C. and at a pressure of less than or equal to about 1 Torr. The drying process may be conducted for a time of greater than or equal to about 4 hours.

In one variation, the calcining the metal salt to selectively generate a porous coating of metal oxide on the support includes heating the metal salt and the catalyst compound disposed on the support at greater than or equal to about 400° C. to less than or equal to about 600° C. for greater than or equal to about 2 hours.

In other aspects, the present disclosure provides a method of preparing a sinter-resistant catalyst system. The method optionally includes contacting a plurality of support particles each including a surface bearing at least one catalyst particle with a liquid including a metal salt and having a pH of less than or equal to about 6. Then, the metal salt is precipitated onto the surface bearing the at least one catalyst particle. The method also includes calcining the metal salt to selectively generate a porous coating of metal oxide on the surface bearing the at least one catalyst particle. The porous coating is distributed around the at least one catalyst particle on the surface.

In one variation, prior to the contacting, the method further includes disposing the support having the surface including the catalyst particle in a reducing atmosphere to promote conversion of the catalyst particle to a metallic state.

In one variation, the disposing the support including the catalyst particle in the reducing atmosphere further includes disposing the support including the catalyst particle in a furnace. The furnace is then purged with a gas mixture comprising an inert gas and hydrogen ($H_2$) at less than or equal to about 3% by volume for greater than or equal to about 30 minutes. The support including the catalyst particle is heated in the furnace having a temperature of greater than or equal to about 200° C. to less than or equal to about 500° C. The method also includes maintaining the support including the catalyst particle at the temperature for greater than or equal to about 30 minutes and cooling the support including the catalyst particle to ambient conditions.

In yet other aspects, the present disclosure provides a catalyst system including a platinum group metal catalyst bound to a metal oxide support. A crystalline coating of metal oxide nanoparticles is selectively disposed on the metal oxide support around the platinum group metal catalyst. The crystalline coating has a porosity of greater than about 20% to less than about 70% and covers greater than or equal to about 1.5% to less than or equal to about 80% of the surface area of the exposed surface, excluding the regions bound to the platinum group metal catalyst, of the metal oxide support.

The catalyst may include a metal selected from the group consisting of: platinum (Pt), ruthenium (Ru), rhodium (Rh), palladium (Pd), osmium (Os), iridium (Ir), gold (Au), iron (Fe), nickel (Ni), manganese (Mn), and combinations thereof. In variations where the catalyst is a platinum group metal catalyst, a metal may be selected from the group consisting of: platinum (Pt), ruthenium (Ru), rhodium (Rh), palladium (Pd), osmium (Os), iridium (Ir), gold (Au), and combinations thereof. The support includes a metal oxide selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof; and the metal oxide nanoparticles include aluminum oxide ($Al_2O_3$).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
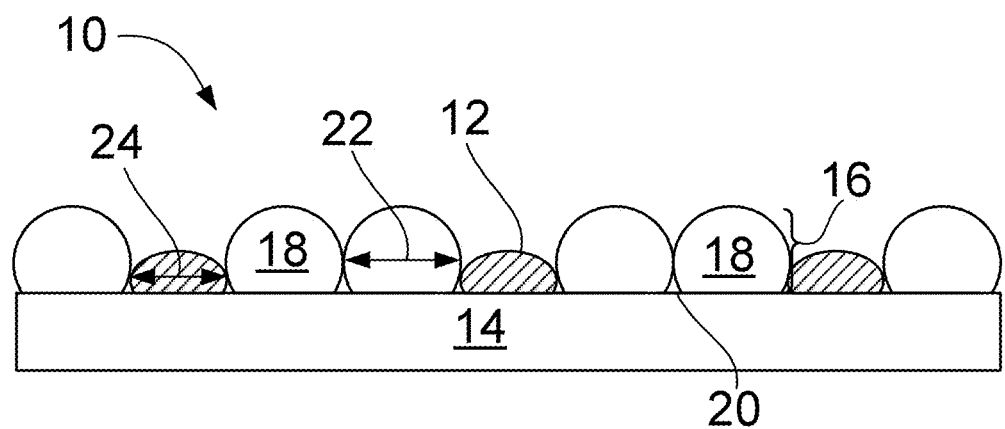
FIG. 1 is an illustration of a sinter-resistant monolithic catalyst system prepared according to certain aspects of the present technology.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and B.

Example embodiments will now be described more fully with reference to the accompanying drawings.

Chemistry-based approaches for stabilizing metal nanoparticles have been met with limited success. Accordingly, the present technology provides a solution-based approach for minimizing or eliminating the sintering process that may otherwise occur with catalyst nanoparticles. This approach generates porous coatings selectively distributed on surfaces of catalyst supports having metal nanoparticles bound thereto, which decreases catalyst activity loss by suppressing aging caused by sintering. The current solution-based approach, relative to other chemistry-based approaches, is a wet-chemistry process, which results in a higher thermal durability and reduces catalyst metal loading requirements, which can potentially lead to significant cost savings. The present technology can be self-limiting and may obstruct fewer active sites on catalyst particles relative to other coating methods that may entirely coat the surface of the catalyst metal nanoparticles and/or to result in multiple coating layers, so that a potential loss in the number of available catalyst active sites may occur.

In certain aspects, the coating of the present technology may be selectively deposited and may inhibit sintering in part by physical separation of adjacent catalyst metal nanoparticles. For example, relative to a conventional catalyst system having the same catalyst and support material, but lacking the porous coating, the present technology may reduce a catalyst metal loading requirement by greater than or equal to about 30%, greater than or equal to about 40%, greater than or equal to about 50%, greater than or equal to about 60%, greater than or equal to about 70%, greater than or equal to about 80% or great than or equal to about 90%, such as from about 30% to about 90%, from about 40% to about 80%, from about 50%, to about 80%, from about 60% to about 80%, or from about 70% to about 80%. In other aspects, relative to a conventional catalyst system having the same catalyst and support material, but lacking the porous coating, the present technology may reduce a lightoff temperature by greater than or equal to about 10° C., optionally greater than or equal to about 20° C., and in certain variations, optionally reduce a lightoff temperature from greater than or equal to about 30° C.

Accordingly, the present technology provides a method for preparing a catalyst through a solution-based approach. The method may include binding at least one catalyst to a catalyst support. The catalyst may be a nanoparticle. The catalyst optionally comprises one or more platinum group metals (PGM), noble group metals, or the like. For example, the catalyst may comprise one or more platinum group metals, such as ruthenium (Ru), rhodium (Rh), palladium (Pd), osmium (Os), iridium (Ir), platinum (Pt), or combinations thereof noble metals, such as ruthenium (Re), copper (Cu), silver (Ag), gold (Au), or combinations thereof or other metals, such as iron (Fe), nickel (Ni), manganese (Mn), sodium (Na), potassium (K), magnesium (Mg), calcium (Ca), barium (Ba), or combinations thereof. For example, the catalyst particle optionally comprises a metal selected from the group consisting of: platinum (Pt), ruthenium (Ru), rhodium (Rh), palladium (Pd), osmium (Os) nanoparticle, iridium (Ir), gold (Au), iron (Fe), nickel (Ni), manganese (Mn), and combinations thereof. In one variation, the catalyst particle may comprise platinum (Pt), palladium (Pd), or mixtures thereof.

The catalyst particle may have a maximum diameter of greater than or equal to about 2 nm to less than or equal to about 10 nm, such as a diameter of about 2 nm, about 3 nm, about 4 nm, about 5 nm, about 6 nm, about 7 nm, about 8 nm, about 9 nm, or about 10 nm.

The catalyst support may comprise a metal oxide. The catalyst support may be in the form of a plurality of particulates (e.g., a powder) or a monolith structure (e.g., a honeycomb structure) that may be coated with a washcoat layer that includes the catalyst material. In certain variations, the metal oxide may be selected from the group consisting of: cerium oxide ($CeO_2$), aluminum oxide/alumina ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof. The catalyst support may further comprise dopants. The catalyst support may comprise dopants selected from the group consisting of barium (Ba), cerium (Ce), lanthanum (La), phosphorus (P), and combinations thereof.

If the catalyst support is a monolith structure that includes a washcoat layer, the monolith structure may be formed from any the metal oxides discussed above or zeolites. The washcoat layer may include the same or different metal oxides to form a porous ceramic layer including the catalyst material. The washcoat precursor including the catalyst material(s) can be applied to a surface of the catalyst support and then heat treated, e.g., calcined to form a porous ceramic washcoat layer including the catalyst material dispersed therein.

In other aspects, the support may be provided in a plurality of particles (e.g., powder). In such variations, the support may have an average particle diameter of greater than or equal to about 0.8 μm to less than or equal to about 5 μm, greater than or equal to 1 μm to less than or equal to about 4 μm, greater than or equal to 1.5 μm to less than or equal to about 3.5 μm, or greater than or equal to 2 μm to less than or equal to about 3 μm, such as a diameter of about 0.8 μm, 1 μm, 1.5 μm, 2 μm, 2.5 μm, 3 μm, 3.5 μm, 4 μm, 4.5 μm, or 5 μm. In certain instances, the surface of the catalyst support may have a potential zero charge ("PZC") of less than 7.

After binding a catalyst particle to a catalyst support, also referred to herein as a "supported particle," the method may comprise washing the supported catalyst particle with an acidic solution. Washing may improve the uniformity of the catalyst particle size where a plurality of catalyst particles is disposed on the catalyst support surface. In certain aspects, the solution is aqueous. The acidic solution may comprise acetic acid ($CH_3COOH$), nitric acid ($HNO_3$), and/or citric acid ($C_6H_8O_7$), by way of non-limiting example. Such a washing process may be particularly suitable where the catalyst support and catalyst particles are further pretreated in a reduction reaction.

Accordingly, in certain instances, the method may further include pretreating the supported particle system. For example, the supported particle system may be treated in a reducing atmosphere to promote conversion of the metal(s) in the catalyst particle to a metallic state. In reducing the surface of the catalyst particle, in subsequent deposition steps, the surface of the particle has minimal surface oxygen/hydroxides, thus rendering it more hydrophobic so that it therefore remains uncoated and exposed. It should be noted that certain catalyst particles may not require pre-treatment in a reducing atmosphere as they naturally have less oxidation and active oxygen on the surface that could react in subsequent treatment steps. However, in certain variations, the method optionally includes pretreating, which may include disposing the support having the surface comprising the catalyst particle in a reducing atmosphere to promote conversion of the catalyst particle to a metallic state.

In one variation, the supported particle may be disposed in a reducing atmosphere while placed in a furnace or other vessel that may be sealed and heated. The furnace may be purged with a reducing atmosphere. For example, the furnace may be purged with a gas mixture comprising an inert gas and hydrogen ($H_2$). The gas mixture may comprise less than or equal to about 3% by volume hydrogen ($H_2$) with a balance being the inert gas. For example, the inert gas may be argon (Ar), nitrogen ($N_2$), or other inert gases. In one variation, the gas mixture may comprise argon (Ar) having less than or equal to about 3% by volume hydrogen ($H_2$). Such purging may occur for greater than or equal to about 30 minutes. For example only, in certain instances, the purging may occur for about 1 hour. A flow rate of the gas used for purging may be greater than or equal to about 1 standard cubic feet per hour (SCFH). In other aspects, the supported particle system may be further heated in the furnace having a temperature of greater than or equal to about 200° C. and less than or equal to about 500° C. For example only, in certain instances, the supported particle system may be further heated in the furnace having a temperature of about 400° C. The rate of heating of the supported particle system may occur at a rate of less than or equal to about 20° C. per minute. The supported particle system may be maintained at the temperature for greater than or equal to about 30 minutes. In other instances, the supported particle system may be maintained at the temperature for greater than or equal to about 2 hours. The supported particle system may then be cooled to ambient conditions, for example, to room temperature. After the optional reduction step of the active catalyst particle in the supported particle system, a porous coating may then be formed on a surface of the support.

Therefore, the method may further include contacting the supported particle with a solution comprising a metal salt dissolved in a solvent. In certain instances, the solution has an acidic pH. For example only, the solution may have a pH of less than or equal to about 6. In other instances, the solution may have a pH of less than or equal to about 5. In certain instances, the surface of the catalyst support in solution may be positively charged. The metal salt may comprise an element selected from the group consisting of: aluminum (Al), cerium (Ce), zirconium (Zr), titanium (Ti), silicon (Si), magnesium (Mg), zinc (Zn), sodium (Na), potassium (K), barium (Ba), calcium (Ca), and combinations thereof. In other instances, the metal salt may have a molar concentration from greater than or equal to about 0.1M to less than or equal to about 1M in the solution. The concentration of the metal salt may be dependent upon the PGM loading requirements and the size of the support. Additionally, the metal salt may have a concentration of greater than or equal to about 1 wt. % to less than or equal to about 50 wt. % relative to the weight of the catalyst support after it is deposited, as described further herein.

As non-limiting examples, suitable salts of Al include $AlCl_3$, $Al(NO_3)_3$, $Al(OH)_3$, $Al_2(SO_4)_3$, $Al(ClO_3)_3$, $AlPO_4$, and $Al(PO_3)_3$; salts of Ce include $Ce(NO_3)_3$, $Ce(OH_4)$, $Ce_2(SO_4)_3$, and $Ce(SO_4)_2$; salts of Zr include $Zr(HPO_4)_2$, $Zr(OH)_4$, and $Zr(SO_4)_2$; salts of Ti include $TiOSO_4$ and $TiOPO_4$; salts of Si include $SiPO_4(OH)$; salts of Mg include $MgSO_4$, $Mg(NO_3)_2$, $MgHPO_4$, and $Mg_3(PO_4)_2$; salts of Zn include $Zn(NO_3)_2$, $Zn_3(PO_4)_2$, and $ZnSO_4$; salts of Ba include $BaCO_3$, $BaCl_2$, and $BaCrO_4$; salts of K include $KHSO_4$, $KCl$, $K_2CO_3$, $K_2CrO_4$, $K_2Cr_2O_7$, $KOH$, $KIO_3$, $KI$, $K_2MnO_4$, $KVO_3$, $K_2MoO_4$, $KNO_3$, $KClO_4$, $K_2S_2O_8$, $K_2HPO_4$, $K_4P_2O_7$, and $K_2SO_4$; salts of Na include $NaBr$, $NaCl$, $Na_2CO_3$, $Na_2CrO_4$, $HCOONa$, $NaHSO_4$, $NaOH$, $NaBO_2$, $Na_2O_3Si$, $NaVO_3$, $Na_2MoO_4$, $NaNO_3$, $NaOOC$-$COONa$, $NaMnO_4$, $Na_3PO_4$, $Na_2HPO_4$, $Na_2H_2P_2O_7$, $Na_4P_2O_7$, $Na_2SO_4$, and $Na_3P_3O_9$; salts of Ca include $CaCl_2$, $CaCO_3$, $CaFPO_3$, $Ca(OH)_2$, $Ca(IO_3)_2$, $Ca(NO_3)_2$, $Ca(NO_2)_2$, $CaC_2O_4$, $Ca(H_2PO_4)_2$, $Ca_2P_2O_7$, and $CaSO_4$; and any combinations of these salts may be employed in the solution. In one variation, the metal salt may comprise Al and be selected from the group consisting of: $AlCl_3$, $Al(NO_3)_3$, $Al(OH)_3$, $Al_2(SO_4)_3$, $Al(ClO_3)_3$, $AlPO_4$, $Al(PO_3)_3$, and combinations thereof. The solvent is non-limiting, and can be water, an alcohol, or other organic solute. In certain aspects, the solution is aqueous. The pH of the solution may be maintained by adding diluted acid. For example, in certain instances, the pH of the solvent may be maintained by adding diluted $HNO_3$.

Next, the method comprises contacting a support having a surface comprising a catalyst particle with a solution comprising a metal salt and having an acidic pH. In this manner, the metal salt can precipitate onto the surface of the support and is selectively applied to form a porous coating of metal oxide on the supported particle system. A time may lapse between the reduction treatment and the instance when the supported particle is brought into contact with the solution comprising the metal salt and having an acidic pH. In certain instances, a week or more may elapse between the pretreatment and the instance when the supported particle is brought into contact with the solution comprising the metal salt and having an acidic pH. In certain aspects, the contacting of the surface of support (comprising the catalyst particle) with the solution includes submerging the surface in the solution. The method may further include applying ultrasound to the solution to facilitate the precipitating and/or mixing the solution with a planetary centrifugal mixer to facilitate the precipitating.

Depositing the metal salts on the surface of the support may comprise agitating the supported particle and the solution comprising the metal salt, for example, by applying ultrasound for greater than or equal to about 5 minutes to facilitate precipitation. For example only, in some instances, the supported particle and the solution comprising the metal salt may be agitated by applying ultrasound for greater than or equal to about 15 minutes and in certain other variations, for about 30 minutes. In certain instances, the supported particle and solution may be mixed using a high speed planetary centrifugal mixing. For example, the supported particle and solution may be mixed using the high speed planetary centrifugal mixture for greater than or equal to about 5 minutes. In certain instances, the metal salt will hydrolyze and become negatively charged. The negatively charged metal salts may bind in a self-limiting manner to the exposed surface of the catalyst support. After a predetermined duration of time, the supported particle system may be removed from the solution.

Applying the metal salts to the surface of the support may further comprise removing the solvent from the supported particle system having the liquid disposed thereon, such as, for example, by evaporation or drying. In certain instances, evaporating or drying the solvent is performed by increasing the temperature or decreasing the pressure near the supported particle in contact with the metal salt solution to facilitate precipitation of the metal salt on the surface of the support. In certain instances, drying is performed at a temperature of greater than or equal to about 50° C. For example only, drying may be performed at a temperature of about 80° C. Drying may be performed at a pressure of less than or equal to about 1 Torr. Drying may be performed for a time of greater than or equal to about 4 hours. For example only, drying may be performed for a time of about 6 hours. For example only, drying may occur in a vacuum oven where over a course of a hour the vacuum oven may be gradually heated to greater than or equal to about 80° C. at a pressure of 1 Torr. After warming, the vacuum oven may be keep at 80° C. for greater than or equal to about 6 hours. However, it is understood that other temperatures and durations may be used to remove solvent from support particles.

The method may further comprise calcining the metal salts after precipitation to generate a porous oxide coating on the support, wherein the metal oxide is derived from the metal salt. In certain aspects, the methods of the present disclosure selectively generate a porous coating of metal oxide on the surface of the support distributed around the catalyst particle(s). The porous coating thus formed has a porosity, i.e., a volume of pores relative to the volume of coating, of greater than or equal to about 20% to less than or equal to about 70%, such as a porosity of about 20%, about 30%, about 40%, about 50%, about 60%, or about 70%.

Calcining includes heating the catalyst particle, support, and metal salts at a temperature of greater than or equal to about 400° C. to less than or equal to about 600° C., such as at a temperature of about 550° C., for a time of greater than or equal to about 2 hours to generate a porous coating of metal oxide nanoparticles on the support. In various aspects, the temperature applied during calcining does not exceed the melting point of the metal oxide derived from the metal salt. Non-limiting examples of metal oxides formed from metal salts include $Al_2O_3$, $CeO_2$, $ZrO_2$, $TiO_2$, $SiO_2$, $MgO$, $ZnO$, $BaO$, $K_2O$, $Na_2O$, $CaO$, and combinations thereof.

With reference to FIG. 1, the current technology provides a catalyst system 10 that resists sintering and retains catalytic activity after prolonged exposures to elevated temperatures. The catalyst system 10 can be a catalyst system generated by the method provided herein. The catalyst system 10 includes metal nanoparticles 12 (catalyst) bound to a catalyst metal oxide support 14 in the form of a monolith structure and a coating 16 of metal oxide nanoparticles 18 disposed on the metal oxide support 14. The coating 16 is intermittently and selectively disposed on a surface 20 of the metal oxide support 14 distributed around the catalyst metal nanoparticles 12. In this manner, the porous coating 16 leaves at least a portion of the surface(s) of the catalyst metal nanoparticles 12 exposed so that the active metal sites are available for reaction. In this manner, in certain aspects, the coating 16 avoids covering the catalyst metal nanoparticles 12 or at least partially avoids covering the catalyst metal nanoparticles 12. In certain instances, the catalyst metal nanoparticles 12 are either directly or indirectly coupled or bound to the metal oxide support 14.

The catalyst particles (e.g., metal nanoparticles 12) may have a loading density on the catalyst support of greater than or equal to about 0.25% (w/w) to less than or equal to 20% (w/w), such as a loading density of about 0.25% (w/w), about 0.5% (w/w), about 1% (w/w), about 1.5% (w/w), about 2% (w/w), about 2.5% (w/w), about 3% (w/w), about 3.5% (w/w), about 4% (w/w), about 4.5% (w/w), about 5% (w/w), about 5.5% (w/w), about 6% (w/w), about 6.5% (w/w), about 7% (w/w), about 7.5% (w/w), about 8% (w/w), about 8.5% (w/w), about 9% (w/w), about 9.5% (w/w), or about 10% (w/w). In certain instances, the loading density of the metal nanoparticles 12 on the metal oxide support 14 is about 1.5% (w/w).

As described above in regard to the method of preparing a catalyst, the nanoparticles 12 may comprise PGM nanoparticles, such as nanoparticles of Ru, Rh, Pd, Os, Ir, or Pt, a noble metal, such as nanoparticles of Re, Cu, Ag, Au, other metals such as nanoparticles of Fe, Ni, Mn, Na, K, Mg, Ca, or Ba, or combinations thereof.

As discussed above, the metal oxide support 14 optionally comprises a metal oxide selected from the group consisting of $Al_2O_3$, $CeO_2$, $ZrO_2$, $TiO_2$ $SiO_2$, MgO, ZnO, BaO, $K_2O$, $Na_2O$, CaO, and combinations thereof. Nonetheless, it is understood that this group of metal oxides is not limited and that other metal oxides may be employed for the support 14. It should be noted that the catalyst support may be a monolith structure as shown in FIG. 1 or alternatively, the support shown in FIG. 1 may be one or more washcoat layers formed on a monolith support structure.

Figure 2:
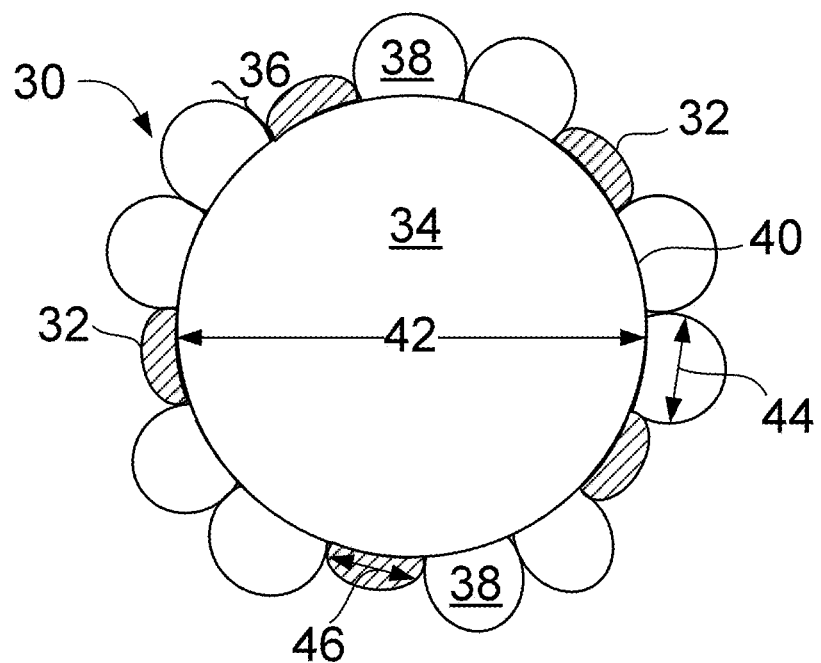
FIG. 2 is an illustration of a sinter-resistant particulate catalyst system prepared according to certain aspects of the present technology.

FIG. 2 shows the catalyst support in the form of a particle (which may be provided as a plurality of particles or powder). A catalyst system 30 that resists sintering and retains catalytic activity after prolonged exposures to elevated temperatures may thus be in the form of a particle. Thus, a plurality of particles like the catalyst system 30 may be combined in a conventional casting process to form a catalyst system. A plurality of metal nanoparticles 32 (catalyst) is bound to a catalyst metal oxide support 34 and a coating 36 of metal oxide nanoparticles 38 is disposed on the metal oxide support 34. In certain instances, the metal nanoparticles 32 are either directly or indirectly coupled or bound to the metal oxide support 34. The coating 36 is intermittently and selectively disposed on a surface 40 of the metal oxide support 34 distributed around the catalyst metal nanoparticles 32.

Where the support is in the form of a plurality of particles, the support particles may have an average diameter 42 of greater than or equal to about 0.8 μm to less than or equal to about 5 μm, greater than or equal to 1 μm to less than or equal to about 4 μm, greater than or equal to 1.5 μm to less than or equal to about 3.5 μm, or greater than or equal to 2 μm to less than or equal to about 3 μm, such as a diameter of about 0.8 μm, about 1 μm, about 1.5 μm, about 2 μm, about 2.5 μm, about 3 μm, about 3.5 μm, about 4 μm, about 4.5 μm, or about 5 μm. It should be noted the catalyst metal oxide support 14 may have shapes or forms other than a planar structure as shown in FIG. 1, for example, it may have conventional monolith or honeycomb shapes or the catalyst support may be in the form of beads for a packed bed catalyst. Moreover, the metal oxide support (either 14 or 34 in FIGS. 1 and 2) may have a surface area of greater than or equal to about 50 m$^2$/g to less than or equal to about 150 m$^2$/g, greater than or equal to about 75 m$^2$/g to less than or equal to about 125, m$^2$/g such as a surface area of about 75 m$^2$/g, about 80 m$^2$/g, about 90 m$^2$/g, about 100 m$^2$/g, about 110, m$^2$/g about 120 m$^2$/g, about 130 m$^2$/g, about 140 m$^2$/g, about 145 m$^2$/g, or about 150 m$^2$/g.

The coating (either 16 or 36 in FIGS. 1 and 2) includes metal oxide nanoparticles (18 or 38), such as for example, $Al_2O_3$, $CeO_2$, $ZrO_2$, $TiO_2$, $SiO_2$, MgO, ZnO, BaO, $K_2O$, $Na_2O$, CaO, and combinations thereof. The metal oxide nanoparticles have an average maximum diameter (either 22 in FIG. 1 or 44 in FIG. 2) of greater than or equal to about 0.5 nm to less than or equal to about 50 nm, greater than or equal to about 1 nm to less than or equal to about 25 nm, or greater than or equal to about 2 nm to less than or equal to about 10 nm, such as a diameter of about 0.5 nm, about 1 nm, about 2 nm, about 3 nm, about 4 nm, about 5 nm, about 10 nm, about 15 nm, about 20 nm, about 25 nm, about 30 nm, about 35 nm, about 40 nm, about 45 nm, or about 50 nm. Nonetheless, the coating (either 16 or 36 in FIGS. 1 and 2) comprising the metal oxide nanoparticles (18 or 38) may be crystalline.

The metal oxide nanoparticles 18 of the coating 16 may comprise greater than about 0% by weight to less than or equal to about 20% by weight of the total catalyst system weight (including the catalyst metal oxide support 14, the metal nanoparticles 12, and the coating 16). In certain instances, the coating 16 may have a thickness of greater than or equal to about 1 mm. The coating 16 may comprise a single layer or multiple layers. The coating 16 of metal oxide nanoparticles 18 may cover a large area of otherwise exposed surface area of the metal oxide support. The coating 16 comprises a plurality of pores, i.e., is porous, such that reacting gas molecules can access the catalyst metal nanoparticles 12 having catalytic activity, yet coalescing of metal nanoparticles 12 with other the metal nanoparticles is minimized or prevented. Therefore, the coating 16 may render the catalyst system 10 resistant to sintering or thermal degradation by increasing the surface area of the catalyst system 10. In particular, by increasing the number of available surface sites of the catalyst system 10, which can be expressed as catalytic metal dispersion.

In certain instances, the nanoparticles (either 12 in FIG. 1 or 32 in FIG. 2) may have a maximum average diameter 24 in FIG. 1 or 46 in FIG. 2 of greater than or equal to about 2 nm to less than or equal to about 10 nm, such as a diameter of about 2 nm, about 3 nm, about 4 nm, about 5 nm, about 6 nm, about 7 nm, about 8 nm, about 9 nm, or about 10 nm.

"Catalyst metal dispersion" refers to a ratio of metal catalyst surface sites to a mass of an entire catalyst system. Therefore, a catalyst system with a high dispersion will have smaller and more highly dispersed metal catalyst relative to a catalyst system with a low dispersion. Relative to a catalyst system equivalent to the catalyst system described herein, but without a porous coating, a catalyst system having an increased resistance to sintering has a dispersion loss of less than 74% after exposure to a temperature of about 650° C. for a time period of about 2 hours. A catalyst system that resists sintering is a catalyst system that undergoes a dispersion loss of less than or equal to about 20%, less than or equal to about 15%, or less than or equal to about 10% after exposure to a temperature of about 650° C. for a time period of about 2 hours.

In certain instances, pores may be defined between metal oxide nanoparticles within the coatings (nanoparticles 18 in coating 16 in FIG. 1 or metal oxide nanoparticles 38 in coating 36 in FIG. 2) having an average diameter of greater than or equal to about 0.5 nm to less than or equal to about 30 nm, such as a diameter of about 0.5 nm, about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, or about 20 nm. The coating optionally has a porosity of greater than or equal to about 20% to less than or equal to about 70%, such as a porosity of about 20%, about 30%, about 40%, about 50%, about 60%, or about 70%.

In various embodiments, the coating may cover greater than or equal to about 1.5% to less than or equal to about 80% of the exposed surface area of the catalyst support, or greater than or equal to about 30% to less than or equal to about 80% of the exposed regions of the surface of the catalyst support. The exposed surfaces of the catalyst support refer to the portions of the catalyst support surface to which catalyst metal particles are not bound. In various embodiments, the coating covers about 40%, about 50%, about 60%, about 70%, or about 80% or more of the exposed surface area of the catalyst support. A total amount of surface area coverage of the support including both the catalyst metal particles and metal oxide nanoparticles (forming the coatings) is greater than or equal to about 30% to less than or equal to about 80%.

In certain instances, the metal oxide nanoparticles (18 of FIG. 1 or 38 of FIG. 2) of the coating (16 of FIG. 1 or 36 of FIG. 2) comprise the same metal oxide composition as the metal oxide support (14 of FIG. 1 or 34 of FIG. 2) composition. In other instances, the metal oxide nanoparticles of the coating comprise a different metal oxide(s) than the support. In yet other instances, the coating comprises a plurality of different metal oxides. Therefore, the catalyst system may include a single species of metal particles and metal oxide support or a plurality of metal particles and metal oxide supports.

Embodiments of the present technology are further illustrated through the following non-limiting examples.

Example 1

A powder of supported nanoparticles comprising platinum group metals (PGM—comprising Pt—Pd) nanoparticles bound to an $Al_2O_3$ (alumina) is first pretreated in a reducing environment. A furnace is purged with Ar+3% $H_2$ for about 1 hour at a flow rate of 1 SCFH. The supported nanoparticle is heated to about 400° C. at a heating rate of less than or equal to about 10° C. per minute. The supported nanoparticles are maintained at about 400° C. for greater than 2 hours and then cooled to room temperature with gas flowing.

An aqueous solution is formed by dissolving $Al(NO_3)_3$ in water. The solution pH is maintained at less than or equal to about 5. The reduced supported nanoparticle gradually contacts the metal salt solution. The supported nanoparticle and the solution are mixed using an ultrasonicator for about 5 minutes. The mixture is gradually heated to about 80° C. over a course of an hour. The mixture is maintained at 80° C. for greater than or equal to about 6 hours and calcined at a temperature that is greater than or equal to about 500° C. and less than or equal to about 550° C. for greater than about 2 hours to generate a porous alumina coating over the catalyst metal oxide support particles.

Figure 3:
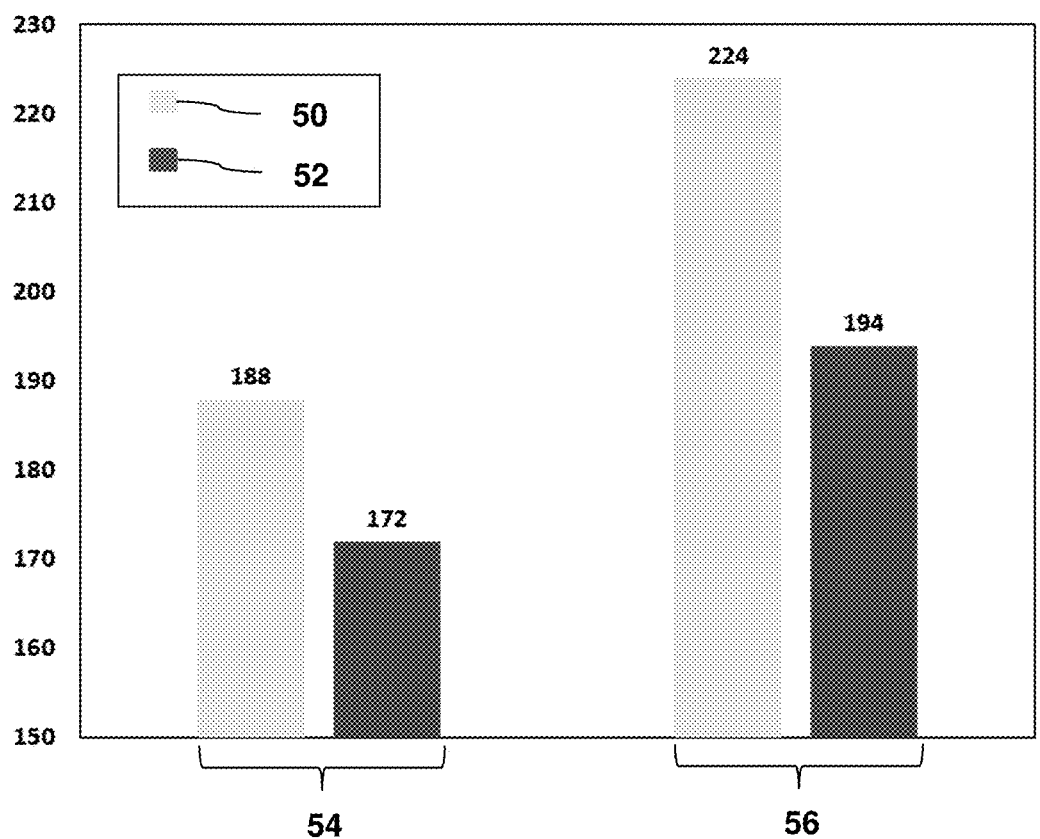
FIG. 3 is a graph showing the lightoff temperatures for a coated powdered Pt—Pd catalyst as compared to a non-coated powdered Pt—Pd catalyst.

The coated-supported nanoparticles and a control of supported nanoparticles without a coating are subjected to aging conditions by heating to about 850° C. for about 2 hours in air having 10% water. To evaluate activity, CO and $C_3H_6$ oxidation reactions are used ($CO+O_2$; $C_3H_6+O_2$). In one instance, a stream of 5000 ppm CO, 1% $O_2$, 5% $H_2O$ is flowed over the catalyst as reaction temperature is increased. In the other instance, a stream of 500 ppm $C_3H_6$, 1% $O_2$, 5% $H_2O$ is flowed over the catalyst as reaction temperature is increased In both instances, the ramping rate is 2° C. per/minute from about 100° C. to about 350° C. The total flow rate is 0.5 L/minute with a balance consisting of $N_2$ gas. The amount of CO and $C_3H_6$ is detected post-catalyst is measured to evaluate the extent of the reaction. As seen in FIG. 3, a metric used to evaluate activity is $T_{50}$ (lightoff temperature), which is the temperature at which 50% of the CO and $C_3H_6$ streams are being oxidized over the catalyst, respectively. After subjecting the control of supported nanoparticles 50 and the coated-supported nanoparticles 52 the gaining conditions described above with respect to the CO oxidation reaction 54, the control of the supported nanoparticles 50 and the coated nanoparticles 52 provided $T_{50}$ 58 values of 188° C. and 172° C., respectively. After subjecting the control of supported nanoparticles 50 and the coated-supported nanoparticles 52 the gaining conditions described above with respect to the $C_3H_6$ oxidation reaction 56, the control of the supported nanoparticles 50 and the coated nanoparticles 52 provided $T_{50}$ 58 values of 224° C. and 194° C., respectively. It is desirable to have low $T_{50}$ 58 values.

Example 2

A general washcoat slurry batching procedure is used to produce laboratory reactor test samples. These samples can range in size from less than 1 $in^3$ to about 10 $in^3$, and require relative small quantities of washcoat slurry to achieve dry washcoat loadings in the range of 1.5-3.5 $g/in^3$.

A ball mill jar with a free capacity of 0.5 L and cylindrical alumina milling media (12 mm diameter×12 mm long) are selected for use. The cylindrical alumina milling media are placed into a ball mill jar having a free capacity. About 60% of the ball mill jar is filled with the alumina milling media. For example, the ball mill jar may have a capacity of about 0.5 L, and the alumina milling media may have a diameter of about 12 mm and a length of about 12 mm. Therefore, the alumina milling media may equal about 625 g or 0.3 L. The volume of the material to be milled, in aqueous suspension, desirably covers the mill media by no more than about 10% of the mill jar volume. The volume of the material charged may be equal to roughly the void volume of the media charge plus 10% of the jar's volume. The final slurry may have a milled washcoat density of greater than or equal to about 1 to less than or equal to about 1.5 g/mL and target solids fractions ($F_s$) of greater than or equal to about 0.45 and less than or equal to about 0.50. The water and the dry PGM alumina catalyst will each have a mass of 90 g in the final slurry.

After ball milling for about 30 minutes, the slurry is washcoated onto monolith core samples having a diameter of about three-quarters of an inch, a length of greater than or equal to about 1 inch with about 400 cells per square ("CPSI") with about a 4 mill-inch wall thickness. After washcoating, the monolithic catalyst is dried at about 120° C. and calcined at a temperature that is greater than or equal to about 500° C. and less than or equal to about 550° C. for greater than about 2 hours in first static air to generate a porous alumina coating over the catalyst metal oxide supports.

Example 3

FIG. 3 shows lightoff temperatures 58 (° C.) versus for a comparative control catalytic system with a Pt—Pd catalyst on $Al_2O_3$ support having no coating (50) and coated-supported nanoparticles (52) prepared in accordance with certain principles of the present disclosure as described in Example 1. The comparative catalytic systems are subjected to aging conditions by heating to about 850° C. for about 2 hours in air having 10% water. To evaluate activity, CO and $C_3H_6$ oxidation reactions are used ($CO+O_2$; $C_3H_6+O_2$). FIG. 3 shows CO lightoff temperatures 54 and $C_3H_6$ lightoff temperatures 56, where the lower the lightoff temperature, the better the performance of the catalytic system. In one instance, a stream of 5000 ppm CO, 1% $O_2$, 5% $H_2O$ is flowed over the catalyst as reaction temperature is increased. In the other instance, a stream of 500 ppm $C_3H_6$, 1% $O_2$, 5% $H_2O$ is flowed over the catalyst as reaction temperature is increased. In both instances, the ramping rate is 2° C. per/minute from about 100° C. to about 350° C. The total flow rate is 0.5 L/minute with a balance consisting of $N_2$ gas. The amount of CO and $C_3H_6$ is detected post-catalyst is measured to evaluate the extent of the reaction in either instance, (i.e., coated and non-coated supported nanoparticles). Thus, the inventive coated-supported nanoparticles 52 show lower lightoff temperatures and improved catalytic performance as compared to the control 50 for both CO and $C_3H_6$.

Example 4

Figure 4:
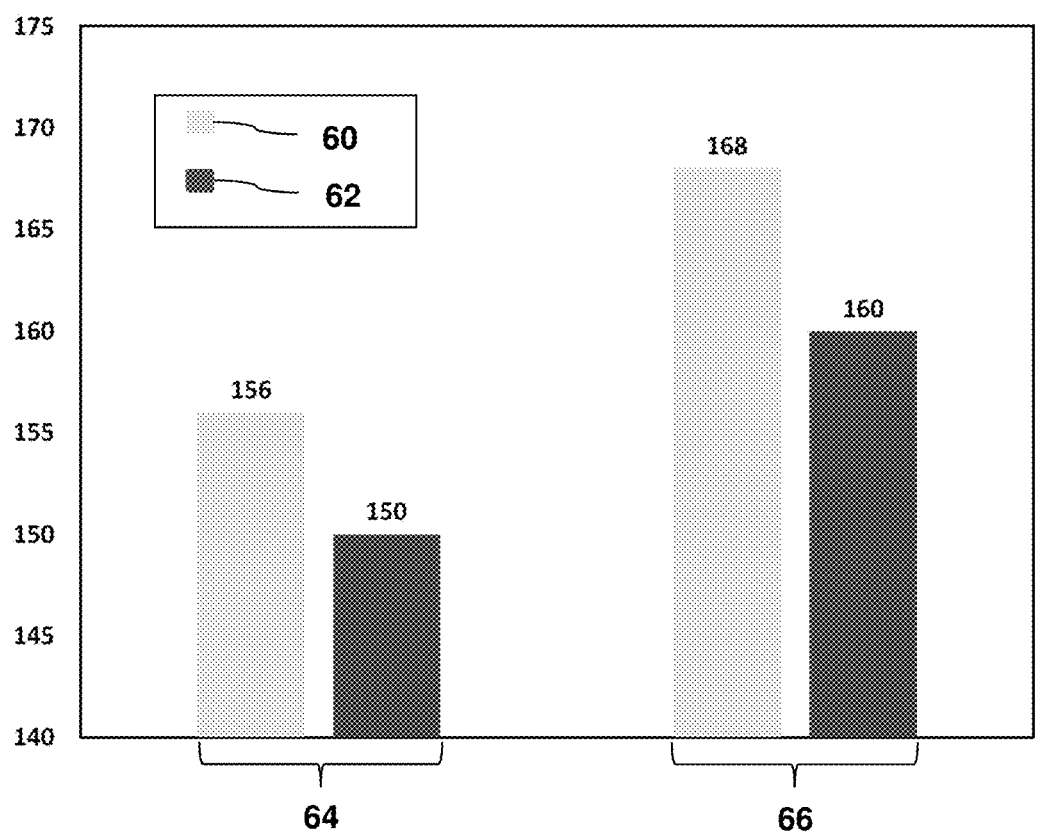
FIG. 4 is a graph showing the lightoff temperature at 50% conversion for a coated monolith Pt—Pd catalyst as compared to a non-coated monolith Pt—Pd catalyst.

As seen in FIG. 4, another metric used to evaluate activity is $T_{50}$, which is the lightoff temperature at which 50% of the CO and $C_3H_6$ streams are being oxidized over the catalyst, respectively. A comparative control catalytic system with a Pt—Pd catalyst on $Al_2O_3$ support having no coating (60) and coated-supported nanoparticles (62) are prepared in accordance with certain principles of the present disclosure as described in Example 1. After subjecting the control of supported nanoparticles 60 and the coated-supported nanoparticles 62 to the gaining conditions described above with respect to the CO oxidation reaction 64, the control of the supported nanoparticles 60 and the coated nanoparticles 62 provided $T_{50}$ 68 values of 156° C. and 150° C., respectively. After subjecting the control of supported nanoparticles 60 and the coated-supported nanoparticles 62 to the gaining conditions described above with respect to the $C_3H_6$ oxidation reaction 66, the control of the supported nanoparticles 60 and the coated-supported nanoparticles 62 provided $T_{50}$ 68 values of 168° C. and 160° C., respectively.

Example 5

Figure 5:
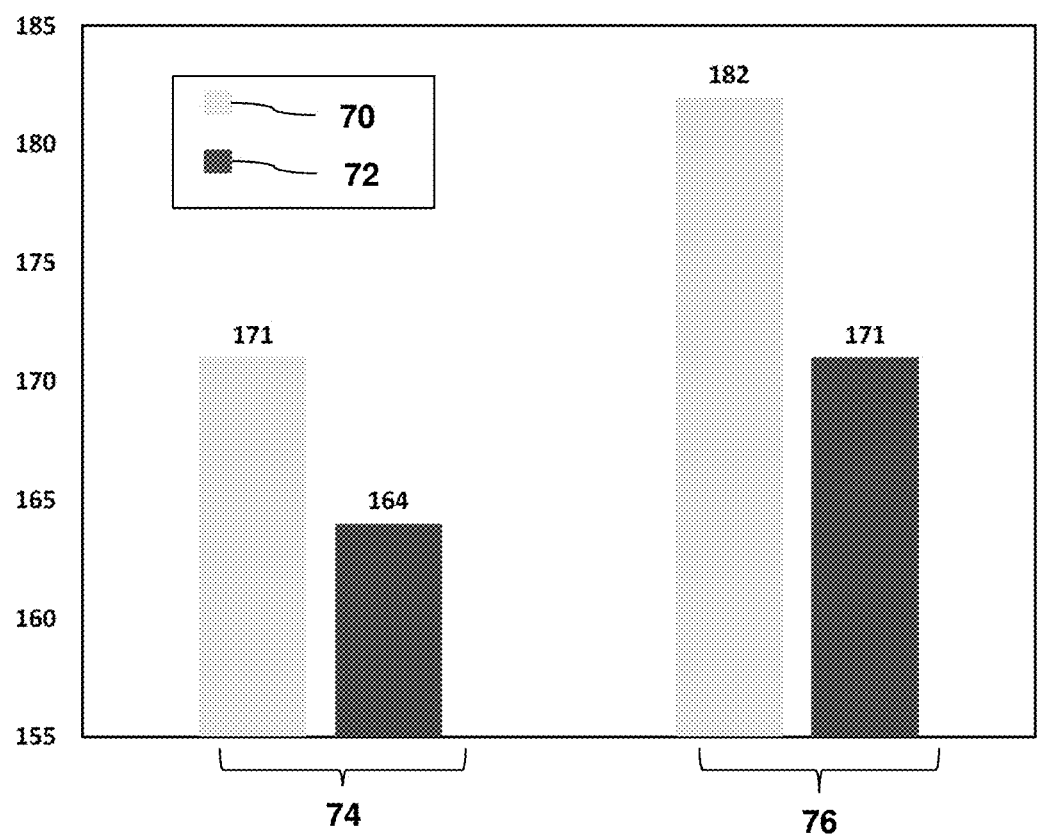
FIG. 5 is a graph showing the lightoff temperature at 90% conversion for a coated monolith Pt—Pd catalyst as compared to a non-coated monolith Pt—Pd catalyst.

As seen in FIG. 5, another metric used to evaluate activity is $T_{90}$, which is the lightoff temperature at which 90% of the CO and $C_3H_6$ streams are being oxidized over the catalyst, respectively. A comparative control catalytic system with a Pt—Pd catalyst on $Al_2O_3$ support having no coating (70) and coated-supported nanoparticles (72) are prepared in accordance with certain principles of the present disclosure as described in Example 1. After subjecting the control of supported nanoparticles 70 and the coated-supported nanoparticles 72 the gaining conditions described above with respect to the CO oxidation reaction 74, the control of the supported nanoparticles 70 and the coated nanoparticles 72 provided $T_{90}$ 78 values of 171° C. and 164° C., respectively. After subjecting the control of supported nanoparticles 70 and the coated-supported nanoparticles 72 the gaining conditions described above with respect to the $C_3H_6$ oxidation reaction 76, the control of the supported nanoparticles 70 and the coated nanoparticles 72 provided $T_{90}$ 78 values of 182° C. and 171° C., respectively. It is desirable to have low $T_{50}$ 68 and $T_{90}$ 78 values.

The foregoing description has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A catalyst system comprising:
   a platinum group metal catalyst bound to a metal oxide support, the metal oxide support defined by a plurality of particles having an average particle diameter greater than or equal to about 0.8 micrometers to less than or equal to about 5 micrometers, a surface area of the metal oxide support being greater than or equal to about 50 m²/g to less than or equal to about 150 m²/g, the metal oxide support comprising aluminum oxide ($Al_2O_3$); and
   a crystalline coating of metal oxide nanoparticles that comprise aluminum oxide ($Al_2O_3$) disposed on the metal oxide support around the platinum group metal catalyst, wherein the crystalline coating has a porosity of greater than about 20% to less than about 70% and covers greater than or equal to about 1.5% to less than or equal to about 80% of an exposed surface area of the metal oxide support.

2. The catalyst system according to claim 1, wherein the platinum group metal catalyst comprises a metal selected from the group consisting of: platinum (Pt), ruthenium (Ru), rhodium (Rh), palladium (Pd), osmium (Os), iridium (Ir), gold (Au), and combinations thereof.

3. The catalyst system according to claim 1, wherein the metal oxide nanoparticles further comprise an element selected from the group consisting of: cerium (Ce), zirconium (Zr), titanium (Ti), silicon (Si), magnesium (Mg), zinc (Zn), sodium (Na), potassium (K), barium (Ba), calcium (Ca), and combinations thereof.

4. The catalyst system according to claim 1, wherein the metal oxide nanoparticles further comprise a metal oxide selected from the group consisting of: cerium oxide ($CeO_2$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), and combinations thereof.

5. The catalyst system according to claim 1, wherein the metal oxide support further comprises a metal oxide selected from the group consisting of: cerium oxide ($CeO_2$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof; and the metal oxide nanoparticles comprise aluminum oxide ($Al_2O_3$).

6. The catalyst system according to claim 1, wherein a loading density of the platinum group metal catalyst on the metal oxide support is greater than or equal to about 0.25% (w/w) to less than or equal to about 20% (w/w).

7. The catalyst system according to claim 1, wherein the metal oxide nanoparticles have an average diameter of greater than or equal to about 0.5 nm to less than or equal to about 50 nm, and the crystalline coating comprises pores having an average diameter of greater than or equal to about 0.5 nm to less than or equal to about 30 nm.

8. A catalyst system comprising:
a platinum group metal catalyst selected from the group consisting of: palladium, platinum, and combinations thereof bound to a metal oxide support comprising aluminum oxide ($Al_2O_3$) and defined by a plurality of particles having an average diameter greater than or equal to about 0.8 micrometers to less than or equal to about 5 micrometers, and a surface area of the metal oxide support being greater than or equal to about 50 $m^2/g$ to less than or equal to about 150 $m^2/g$; and
a crystalline coating of metal oxide nanoparticles the comprise aluminum oxide ($Al_2O_3$) distributed around the platinum group metal catalyst on the metal oxide, wherein the crystalline coating has a porosity of greater than about 20% to less than about 70% and covers greater than or equal to about 1.5% to less than or equal to about 80% of an exposed surface area of the metal oxide support.

9. The catalyst system according to claim 8, wherein the metal oxide nanoparticles further comprise a metal oxide selected from the group consisting of: cerium oxide ($CeO_2$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), and combinations thereof.

10. The catalyst system according to claim 8, wherein the metal oxide support further comprises a metal oxide selected from the group consisting of: cerium oxide ($CeO_2$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof, and the metal oxide nanoparticles comprise aluminum oxide ($Al_2O_3$).

11. The catalyst system according to claim 8, wherein a loading density of the platinum group metal catalyst on the metal oxide support is greater than or equal to about 0.25% (w/w) to less than or equal to about 20% (w/w).

12. The catalyst system according to claim 8, wherein the metal oxide nanoparticles have an average diameter of greater than or equal to about 0.5 nm to less than or equal to about 50 nm, and the crystalline coating comprises pores having an average diameter of greater than or equal to about 0.5 nm to less than or equal to about 30 nm.

13. A catalyst system comprising:
a platinum group metal catalyst selected from the group consisting of: palladium, platinum, and combinations thereof bound to a metal oxide support comprising aluminum oxide ($Al_2O_3$) and defined by a plurality of particles having, an average diameter greater than or equal to about 0.8 micrometers to less than or equal to about 5 micrometers, and a surface area of the metal oxide support being greater than or equal to about 50 $m^2/g$ to less than or equal to about 150 $m^2/g$; and
a crystalline coating of metal oxide nanoparticles that comprise aluminum oxide ($Al_2O_3$) disposed on the metal oxide support around the platinum group metal catalyst, wherein the metal oxide nanoparticles have an average maximum diameter of greater than or equal to about 0.5 nm to less than or equal to about 50 nm, and the crystalline coating has a porosity of greater than about 20% to less than about 70% and covers greater than or equal to about 1.5% to less than or equal to about 80% of an exposed surface area of the metal oxide support.

14. The catalyst system according to claim 13, wherein a loading density of the platinum group metal catalyst on the metal oxide support is greater than or equal to about 0.25% (w/w) to less than or equal to about 20% (w/w).

* * * * *